(12) United States Patent
Zhou et al.

(10) Patent No.: US 9,692,516 B2
(45) Date of Patent: Jun. 27, 2017

(54) OPTICAL TRANSCEIVER AND OPTICAL COMMUNICATIONS PRODUCT

(71) Applicant: Huawei Technologies Co., Ltd., Shenzhen (CN)

(72) Inventors: Chuang Zhou, Greenwood Village, CO (US); Chihao Hu, Wuhan (CN); Heliang Liu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/140,286

(22) Filed: Apr. 27, 2016

(65) Prior Publication Data

US 2016/0323038 A1    Nov. 3, 2016

(30) Foreign Application Priority Data

Apr. 28, 2015  (CN) .......................... 2015 1 0208338

(51) Int. Cl.
*H04B 10/00* (2013.01)
*H04B 10/40* (2013.01)
*H04J 14/02* (2006.01)
*H04B 10/50* (2013.01)
*G02B 6/42* (2006.01)
*G02B 6/293* (2006.01)

(52) U.S. Cl.
CPC ........... *H04B 10/40* (2013.01); *G02B 6/4215* (2013.01); *G02B 6/4292* (2013.01);
(Continued)

(58) Field of Classification Search
CPC ...... H04B 10/40; H04B 10/503; H04B 10/43; H04B 10/2503; H04B 10/801;
(Continued)

(56) References Cited

U.S. PATENT DOCUMENTS 6,122,417 A * 9/2000 Jayaraman ......... G02B 6/29358
                                                    372/50.23
6,201,908 B1 * 3/2001 Grann ................ G02B 6/29358
                                                     385/24
(Continued)

FOREIGN PATENT DOCUMENTS

EP       2620792 A2    7/2013
JP    2005250117 A    9/2005
(Continued)

*Primary Examiner* — Hibret Woldekidan
(74) *Attorney, Agent, or Firm* — Leydig, Voit & Mayer, Ltd.

(57) ABSTRACT

An optical transceiver, including a coupling assembly and a condensing assembly, is provided. The coupling assembly includes a first surface and a second surface; and multiple first lenses are disposed on the first surface. The condensing assembly includes a fastener, multiple filters, a reflector, and a light passing region; the condensing assembly is fastened to the second surface; the filters are optically aligned with the first lenses separately; the coupling assembly receives light of different wavelengths; and the light of different wavelengths enters the fastener through the multiple filters and is multiplexed or demultiplexed by the reflector and the filters, and multiplexed or demultiplexed light enters the coupling assembly through the light passing region. The optical transceiver provided in the present invention has advantages of low power consumption and high coupling efficiency.

12 Claims, 6 Drawing Sheets

(52) U.S. Cl.
CPC ............ *H04B 10/503* (2013.01); *H04J 14/02* (2013.01); *G02B 6/29367* (2013.01); *G02B 6/421* (2013.01); *G02B 6/4206* (2013.01); *G02B 6/4212* (2013.01); *G02B 6/4214* (2013.01); *G02B 6/4244* (2013.01); *G02B 6/4246* (2013.01); *G02B 6/4255* (2013.01)

(58) Field of Classification Search
CPC ................ G02B 6/4215; G02B 6/4292; G02B 6/29367; G02B 6/4206; G02B 6/421; G02B 6/4212; G02B 6/4214; G02B 6/4244; G02B 6/4246; G02B 6/4255; G02B 6/2938; G02B 6/29395; G02B 6/32; G02B 6/2937; H04J 14/02
USPC ... 398/68, 79, 85, 87, 88, 135, 138, 139, 82
See application file for complete search history.

(56) References Cited

U.S. PATENT DOCUMENTS

| | | | |
|---|---|---|---|
| 7,198,416 B2 | 4/2007 | Ray et al. | |
| 8,303,195 B2* | 11/2012 | Adachi | G02B 6/4204 385/73 |
| 8,540,437 B2* | 9/2013 | Lee | G02B 6/4215 385/31 |
| 8,625,989 B2 | 1/2014 | Du et al. | |
| 9,042,731 B2* | 5/2015 | Kurokawa | H04J 14/02 398/91 |
| 9,252,885 B2* | 2/2016 | Kaneko | H04B 10/503 |
| 2002/0131180 A1* | 9/2002 | Goodman | G02B 6/29367 359/634 |
| 2004/0042736 A1* | 3/2004 | Capewell | G02B 6/29367 385/89 |
| 2004/0101247 A1* | 5/2004 | Chen | G02B 6/29367 385/47 |
| 2005/0069013 A1* | 3/2005 | Bhandarkar | G02B 6/4204 372/102 |
| 2008/0106897 A1* | 5/2008 | Yoon | G02B 3/0056 362/235 |
| 2013/0156418 A1 | 6/2013 | Stapleton et al. | |
| 2014/0133862 A1* | 5/2014 | Fujimura | G02B 6/4215 398/79 |
| 2014/0248057 A1 | 9/2014 | Li et al. | |
| 2016/0246008 A1* | 8/2016 | Tan | G02B 6/29365 |

FOREIGN PATENT DOCUMENTS

| | | |
|---|---|---|
| JP | 2014095843 A | 5/2014 |
| WO | WO 0102887 A1 | 1/2001 |

* cited by examiner

OPTICAL TRANSCEIVER AND OPTICAL COMMUNICATIONS PRODUCT

CROSS-REFERENCE TO RELATED APPLICATION

This application claims priority to Chinese Patent Application No. 201510208338.0, filed on Apr. 28, 2015, which is hereby incorporated by reference in its entirety.

TECHNICAL FIELD

The present invention relates to the field of optical communications technologies, and in particular, to an optical transceiver that uses the principle of wavelength division, and related optical modules thereof.

BACKGROUND

An optical transceiver, as an optical communications module, can satisfy requirements on a large-bandwidth, high-rate, and high-density pluggable solution of an optical communications network. A quad small form-factor pluggable (QSFP) module is used as an example, and by using a laser with a rate of 25 Gbps, a transmission rate of four channels of the QSFP module may reach up to 100 Gbps. Currently, a QSFP optical transceiver module exists, including a pair of optical fibers, a pair of planar lightwave circuit splitters, four optical transmitter chip arrays, and four optical receiver chip arrays. The optical fibers are configured to transmit optical signals of the four channels in a unidirectional manner (wavelengths of the optical signals of the four channels are respectively λ1, λ2, λ3, and λ4). The planar lightwave circuit splitters are configured to separately multiplex and demultiplex the optical signals, whose wavelengths are λ1, λ2, λ3, and λ4, of the four channels. Each of the four optical transmitter chip arrays emits an optical signal of one channel, and each of the four optical receiver chip arrays receives an optical signal of one channel. A disadvantage of this technical solution is: currently, direct coupling between light emitted by an optical transmitter chip array and a planar lightwave circuit splitter has poor reliability and a large transmission loss, and is unbeneficial to implementation of a low power consumption requirement of the optical transceiver.

SUMMARY

The present invention provides an optical transceiver having advantages of low power consumption and high coupling efficiency.

To achieve the foregoing objective, implementation manners of the present invention provide technical solutions as follows:

According to a first aspect, the present invention provides an optical transceiver, including: a coupling assembly and a condensing assembly, where the coupling assembly includes a first surface and a second surface that are oppositely disposed; an angle is formed between the second surface and the first surface; multiple first lenses are disposed on the first surface; the condensing assembly includes a fastener, multiple filters, a reflector, and a light passing region; the fastener includes a third surface and a fourth surface that are oppositely disposed; the multiple filters and the light passing region are disposed on the third surface; the light passing region is located on a side of the multiple filters; the reflector is disposed on the fourth surface; the condensing assembly is fastened to the second surface; the multiple filters are optically aligned with the multiple first lenses separately; each of the filters includes a pair of light outgoing/incoming surfaces and a pair of side surfaces; the pair of side surfaces are connected between the pair of light outgoing/incoming surfaces; the pair of light outgoing/incoming surfaces are separately attached to the second surface and the third surface; the side surfaces of each filter are perpendicular to the first surface; the coupling assembly receives light of different wavelengths; and the light of different wavelengths enters the fastener through the multiple filters and is multiplexed or demultiplexed by the reflector and the filters, and multiplexed or demultiplexed light enters the coupling assembly through the light passing region.

With reference to the first aspect, in a first implementation manner, a major axis of each first lens is perpendicular to the first surface.

With reference to the first implementation manner of the first aspect, in a second implementation manner, a range of the angle is from 6° to 13°.

With reference to the first implementation manner of the first aspect, in a third implementation manner, the optical transceiver further includes an optical fiber accommodating member; the coupling assembly further includes a total reflector and a second lens; the optical fiber accommodating member is configured to accommodate an optical fiber; the optical fiber is optically aligned with the second lens; and the total reflector is configured to reflect, between the second lens and the condensing assembly, the light of different wavelengths.

With reference to the third implementation manner of the first aspect, in a fourth implementation manner, the coupling assembly and the optical fiber accommodating member are integrally formed by means of molding.

With reference to the fourth implementation manner of the first aspect, in a fifth implementation manner, the optical fiber accommodating member is provided with an optical fiber jack; the optical fiber jack is configured to accommodate the optical fiber; the optical transceiver further includes a ferrule; the ferrule is located at an end face of the optical fiber and is opposite to the second lens; the ferrule includes a bevel; the bevel is disposed at a side, opposite to the second lens, of the ferrule; and the bevel is configured to reflect light passing through the second lens and incident on the ferrule towards a direction deviating from a major axis of the second lens, so as to prevent light reflected by the ferrule from returning to the second lens along an original light path.

With reference to the fifth implementation manner of the first aspect, in a sixth implementation manner, the ferrule is made of a ceramic or metal material.

With reference to the fifth implementation manner of the first aspect, in a seventh implementation manner, the major axis of the second lens intersects with the bevel, and a range of an angle formed between the bevel and the major axis of the second lens is from 82° to 86°.

With reference to the first implementation manner of the first aspect, in an eighth implementation manner, the coupling assembly are provided with a groove and multiple dispensing grooves; the multiple dispensing grooves are distributed at two sides of the groove and are in communication with the groove; the multiple filters are accommodated in the groove; the second surface is located at a bottom wall of the groove; and the dispensing grooves are configured to be filled with glue, so as to connect the multiple filters to the second surface by means of gluing.

With reference to the eighth implementation manner of the first aspect, in a ninth implementation manner, the coupling assembly is integrally formed by means of molding, and a refractive index of the glue is between a refractive index of a material for the molding and a refractive index of the filters.

With reference to the eighth implementation manner of the first aspect, in a tenth implementation manner, the reflector is a reflective coating coated on the fourth surface of the fastener, or the reflector is an element that is independent from the fastener and is fastened to the fourth surface by means of gluing.

With reference to the first aspect, in an eleventh implementation manner, the multiple first lenses are distributed in a manner of equally spaced rows; a distance between central axes of two adjacent filters is D; a vertical distance between the third surface and the fourth surface of the fastener is T; an angle of reflection of the light of different wavelengths in the fastener is $\alpha$; and $D=2*\mathrm{Tan}(\alpha)*T$.

With reference to the eleventh implementation manner of the first aspect, in a twelfth implementation manner, the distance between the central axes of the two adjacent filters is from 250 micrometers to 1500 micrometers.

With reference to the first aspect, in a thirteenth implementation manner, the pairs of light outgoing/incoming surfaces of the filters are arranged in a parallel manner, and the pairs of side surfaces of the filters are also arranged in a parallel manner.

According to a second aspect, the present invention provides an optical communications product, including: an optical fiber and multiple lasers, where the multiple lasers are configured to emit light of different wavelengths separately, and the optical communications product further includes: the optical transceiver according to any one of the first aspect and the first to thirteenth implementation manners of the first aspect, where the optical transceiver receives the light of different wavelengths emitted by the multiple lasers and transmits the light of different wavelengths to the optical fiber, so as to implement a multiplexing function.

According to a third aspect, the present invention provides an optical communications product, including: an optical fiber and a receiver chip, where the optical fiber is configured to transmit light of different wavelengths to the receiver chip, and the optical communications product further includes: the optical transceiver according to any one of the first aspect and the first to thirteenth implementation manners of the first aspect, where the optical transceiver receives the light of different wavelengths transmitted by the optical fiber and transmits the light of different wavelengths to the receiver chip, so as to implement a demultiplexing function.

In the optical transceiver and the optical communications product provided in the present invention, by forming an angle between a first surface and a second surface of a coupling assembly and designing side surfaces of a filter to be perpendicular to the first surface, light entering a fastener through the filter can pass through a center of the filter, and the light is parallel to the side surfaces of the filter, so as to ensure an optimal optical performance of the filter, ensure a light passing area of the light input from the filter, and reduce a light passing loss of the light, thereby enabling the optical transceiver to have advantages of low power consumption and high coupling efficiency.

BRIEF DESCRIPTION OF DRAWINGS

To describe the technical solutions in the present invention more clearly, the following briefly describes the accompanying drawings required for describing the implementation manners. Apparently, the accompanying drawings in the following description show merely some implementation manners of the present invention, and a person of ordinary skill in the art may still derive other drawings from these accompanying drawings without creative efforts.

DESCRIPTION OF EMBODIMENTS

The following clearly describes the technical solutions in the implementation manners of the present invention with reference to the accompanying drawings in the implementation manners of the present invention.

The present invention provides an optical transceiver. In one implementation manner, an optical transceiver is disposed between an optical fiber and multiple lasers; the multiple lasers separately emit beams of different wavelengths; the optical transceiver is configured to receive the beams of different wavelengths, and multiplex the beams of different wavelengths, that is, integrate the multiple beams of different wavelengths to form one beam of light and transmit the one beam of light by using the optical fiber. In another implementation manner, an optical transceiver is disposed between an optical fiber and a receiver chip; a beam transmitted by the optical fiber includes light of different wavelengths; the receiver chip can receive the light of different wavelengths; and the optical transceiver receives the beam transmitted by the optical fiber and demultiplexes the beam to form multiple beams of light, that is, separates the beams of different wavelengths from each other and then transmits the separated beams to the receiver chip. A process in which the optical transceiver receives and transmits a light path is reversible.

Referring to FIG. 1, FIG. 2, FIG. 3, and FIG. 4, an optical transceiver 100 includes a coupling assembly 10 and a condensing assembly 20. Specifically, the coupling assembly 10 is configured to receive beams and transmit beams, the condensing assembly 20 is configured to multiplex or demultiplex the beams received by the coupling assembly 10, and then multiplexed or demultiplexed beams are transmitted by the coupling assembly 10.

Figure 1:
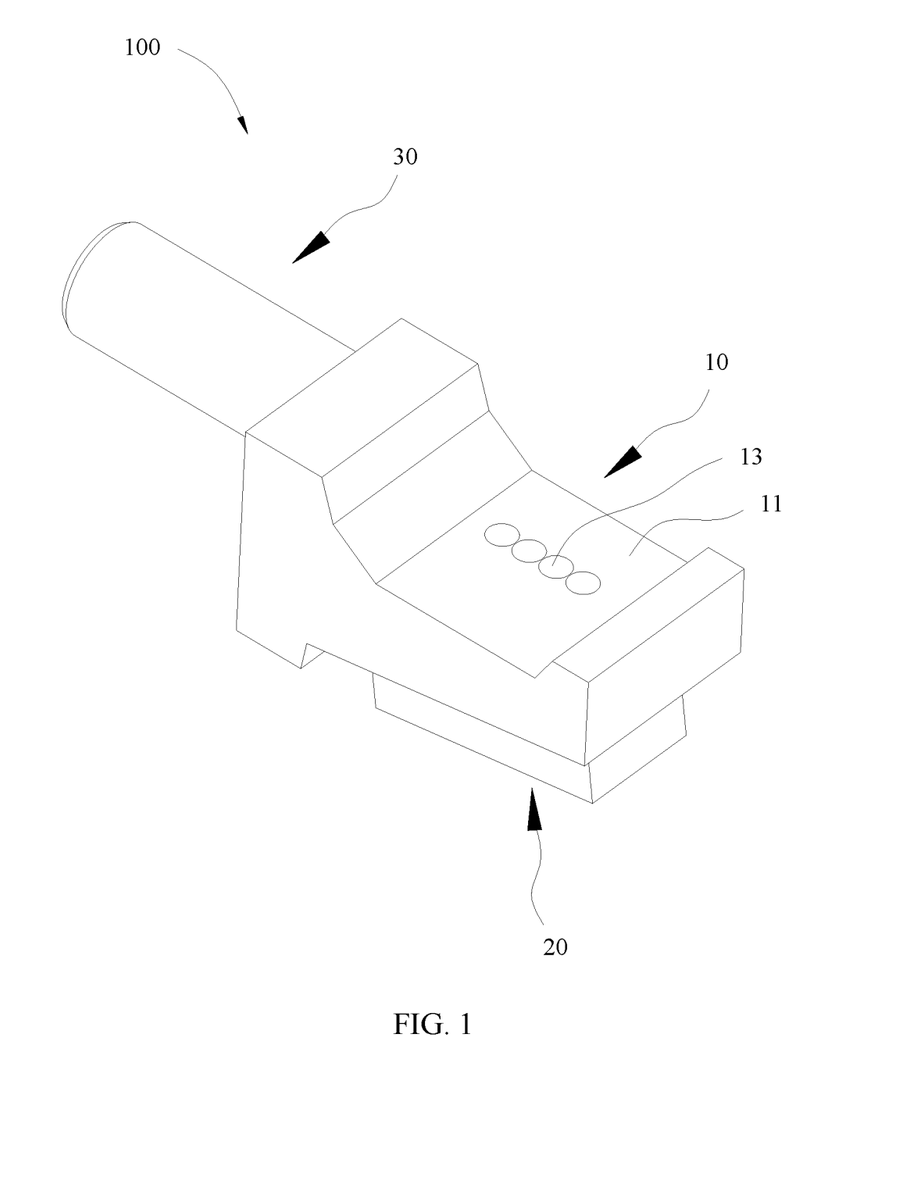
FIG. 1 is a three-dimensional schematic diagram of an optical transceiver according to an implementation manner of the present invention.
Figure 2:
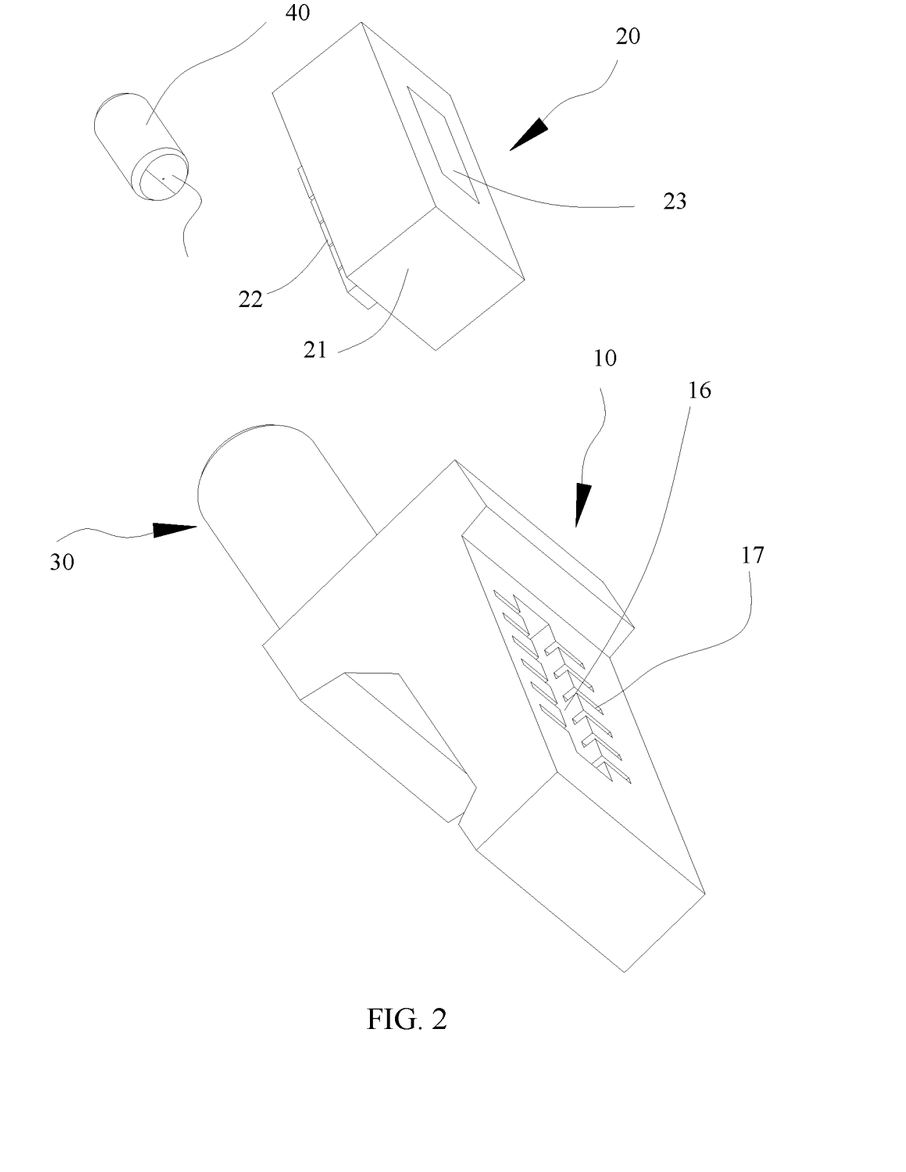
FIG. 2 is a three-dimensional schematic exploded view of an optical transceiver according to an implementation manner of the present invention.
Figure 3:
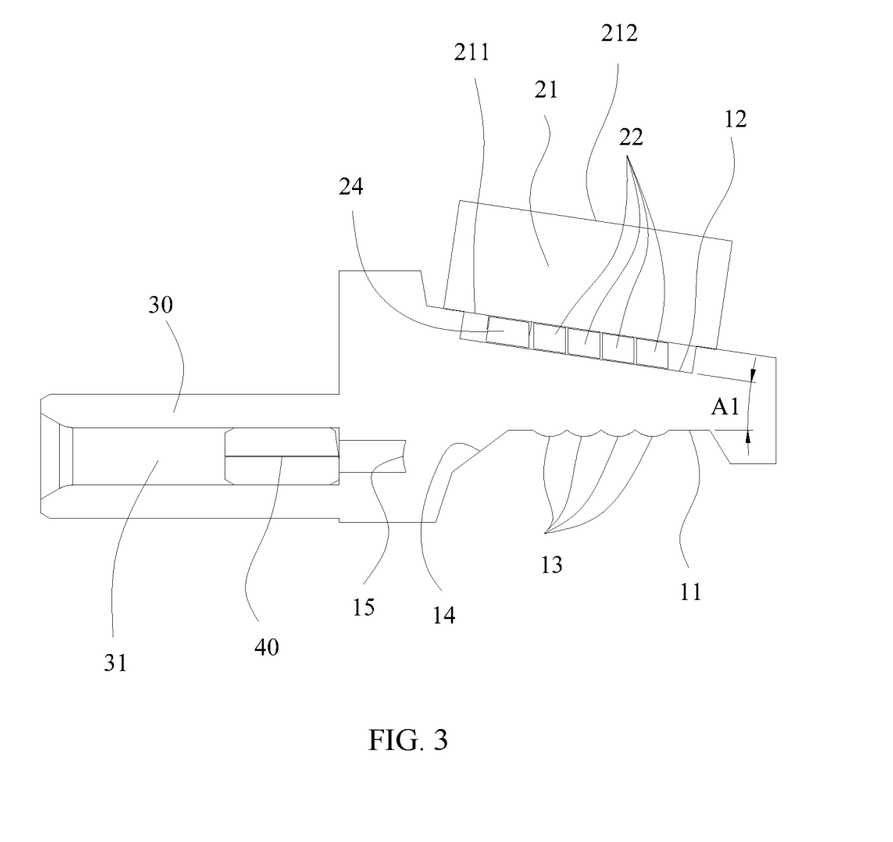
FIG. 3 is a schematic cross-sectional view of an optical transceiver according to an implementation manner of the present invention.

The coupling assembly 10 functions to perform optical in-coupling and out-coupling on an optical fiber and lasers and includes a first surface 11 and a second surface 12 that are oppositely disposed. As shown in FIG. 3, an angle is formed between the second surface 12 and the first surface 11, that is, the second surface 12 is inclined relative to the first surface 11. Multiple first lenses 13 are disposed on the first surface 11. In this implementation manner, the first lenses 13 are designed in an orthoaxial manner, in other words, major axes of the first lenses 13 are perpendicular to the first surface 11. The first lenses 13 designed in an orthoaxial manner can increase a coupling tolerance of the optical transceiver 100 of the present invention. Such design is easily processed in a manufacturing process, and therefore, a product yield can be improved and costs can be reduced. The multiple first lenses 13 are arranged in a manner of sequential adjacent rows. Certainly, in other implementation manners, multiple first lenses 13 may be arranged in a manner of equally spaced rows.

The condensing assembly 20 functions to multiplex and demultiplex (MUX/DEMUX) laser light of different wavelengths and includes a fastener 21, multiple filters 22, and a reflector 23, where the fastener 21 includes a third surface 211 and a fourth surface 212 that are oppositely disposed (as shown in FIG. 3); the multiple filters 22 are disposed on the third surface 211; and the reflector 23 is disposed on the fourth surface 212. The condensing assembly 20 further includes a light passing region 24, where the light passing region 24 is disposed on the third surface 211 and is located on a side of the multiple filters 22. Specifically, the thickness of the light passing region 24 is the same as the thickness of a filter 22; the light passing region 24 is an all-pass filter whose two surfaces are parallel; and the light passing region 24 is also attached to the third surface 211. The light passing region 24 functions to enable a multiplexed beam to pass with a low loss and enter the coupling assembly 10 that performs a multiplexing or demultiplexing function. The condensing assembly 20 is fastened to the second surface 12, and the multiple filters 22 are optically aligned with the multiple first lenses 13 separately, that is, light incident from the first lenses 13 to the coupling assembly 10 is transmitted to the filters 22 separately, and the multiple filters 22 are in a one-to-one correspondence with the multiple first lenses 13. As shown in FIG. 3, four first lenses 13 are disposed on the first surface 11; four filters 22 are disposed on the third surface 211; the light passing region 24 and the filters 22 are located between the second surface 12 and the third surface 211; and the light passing region 24 is located on a side of the filters 22. In this implementation manner, the second surface 12 is parallel to the third surface 211.

Figure 4:
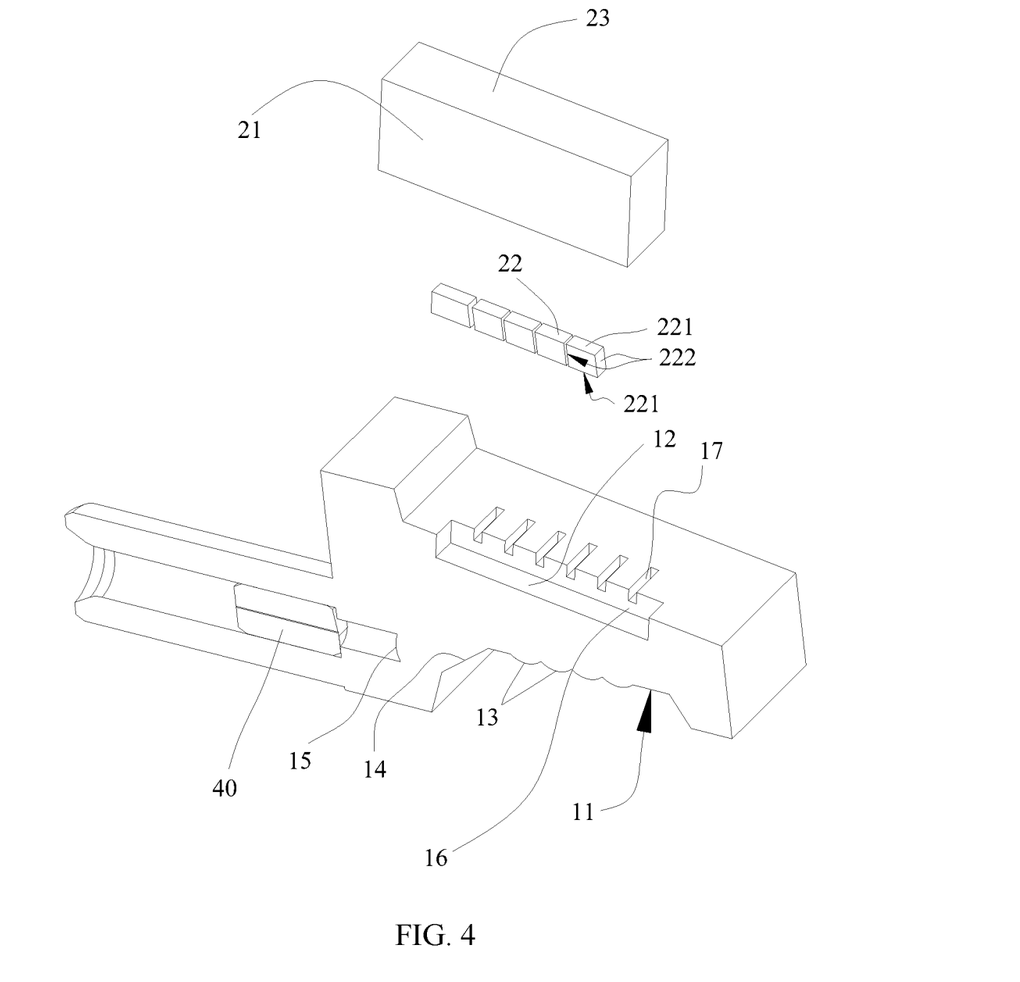
FIG. 4 is a schematic cross-sectional exploded view of an optical transceiver according to an implementation manner of the present invention.

Referring to FIG. 4, each of the filters 22 includes a pair of light outgoing/incoming surfaces 221 and a pair of side surfaces 222; the pair of side surfaces 222 are connected between the light outgoing/incoming surfaces 221; the pair of light outgoing/incoming surfaces 221 are separately attached to the second surface 12 and the fourth surface 212; and the side surfaces 222 of each of the filters 22 are perpendicular to the first surface 11. Specifically, the side surfaces 222 of the filters 22 are cut by means of a bevel cutting process, so as to enable light passing the filters 22 to be parallel to the side surfaces 222, thereby ensuring a light passing area of the light, reducing a light passing loss of the light, and enabling the optical transceiver 100 to have an advantage of low power consumption.

Figure 7:
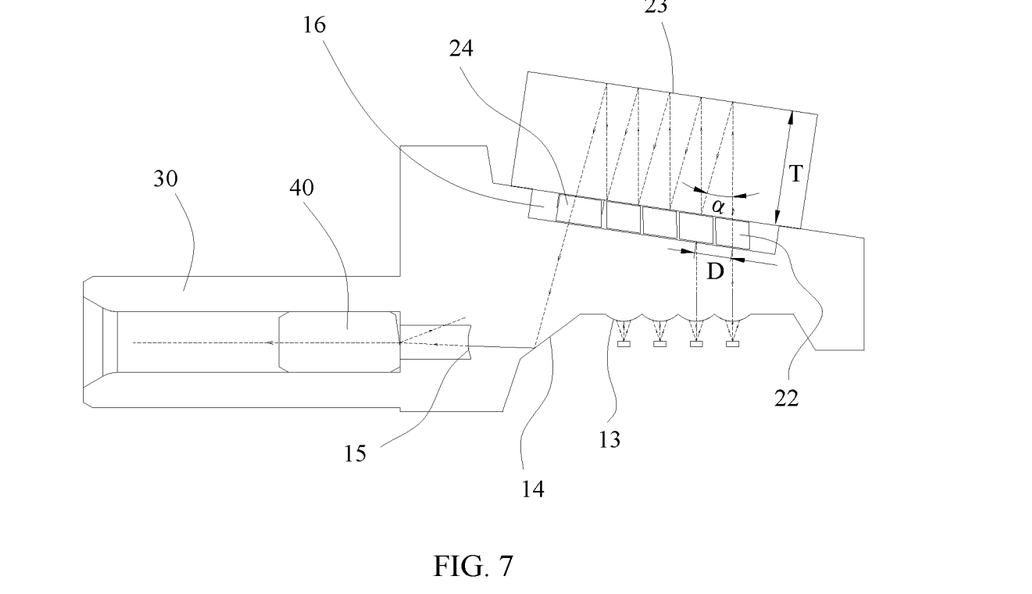
FIG. 7 is a schematic diagram of a light transmission principle of an optical transceiver according to an implementation manner of the present invention.

Referring to FIG. 7, dashed lines with arrows in FIG. 7 represent light. The light of different wavelengths enters the fastener 21 through the multiple filters 22. According to a filtering principle of the filters 22, each of the different filters 22 may only allow one type of light of a wavelength matching the filter to pass through. In an embodiment of the present invention, four types of light of different wavelengths are incident to the fastener 21; the light of different wavelengths are multiplexed or demultiplexed by using the reflector 23 and the filters 22; when light passes through the filters 22 and is incident to the reflector 23, existence of an angle of reflection disposed between the light and the reflector 23 enables the reflector 23 to reflect the light; the light reflected by the reflector 23 does not return to a filter 22 from which the light is incident; and when the light is incident to other filters 22, because each of the different filters 22 may only allow one type of light of a wavelength matching the filter to pass through, the light continues being reflected; and when encountering a light passing region 24 of a condensing assembly 20, the light enters a coupling assembly 10 through the light passing region 24.

In an optical transceiver 100 provided in the present invention, by forming an angle between a first surface 11 and a second surface 12 of a coupling assembly 10 and designing side surfaces 222 of a filter 22 to be perpendicular to the first surface 11, light entering a fastener 21 through the filter 22 can pass through a center of the filter 22, and the light is parallel to the side surfaces 222 of the filter 22, so as to ensure an optimal optical performance of the filter 22, ensure a light passing area of the light input from the filter 22, and reduce a light passing loss of the light, thereby enabling the optical transceiver 100 to have advantages of low power consumption and high coupling efficiency. Specifically, the pairs of light outgoing/incoming surfaces 221 of the filters 22 are arranged in a parallel manner, and the pairs of side surfaces 222 of the filters 22 are also arranged in a parallel manner.

A range of the angle A1 between the first surface 11 and the second surface 12 of the coupling assembly 10 of the present invention is from 6° to 13°.

Further, the optical transceiver 100 further includes an optical fiber accommodating member 30; the coupling assembly 10 further includes a total reflector 14 and a second lens 15; the optical fiber accommodating member 30 is configured to accommodate an optical fiber; the optical fiber is optically aligned with the second lens 15; the total reflector 14 is configured to reflect, between the second lens 15 and the condensing assembly 20, the light of different wavelengths; and after the light of different wavelengths enters the coupling assembly 10 through the light passing region 24 of the condensing assembly 20, the light of different wavelengths is incident to the total reflector 14; the light is incident to the second lens 15 by the total reflector 14; and then reflected light is aggregated to an end of the optical fiber through the second lens 15.

The optical fiber accommodating member 30 is provided with an optical fiber jack 31, and the optical fiber may be assembled in the optical fiber jack 31 in a pluggable manner. The optical fiber accommodating member 30 may be also designed to include an interface for fastening the optical fiber, that is, the optical fiber is fastened in the optical fiber jack 31.

In this implementation manner, the coupling assembly 10 and the optical fiber accommodating member 30 are integrally formed by means of molding. The coupling assembly 10 and the optical fiber accommodating member 30 may be manufactured in a manner of plastic molding, and an optical transceiver 100 obtained in this manner can be miniaturized and low in costs.

Figure 5:
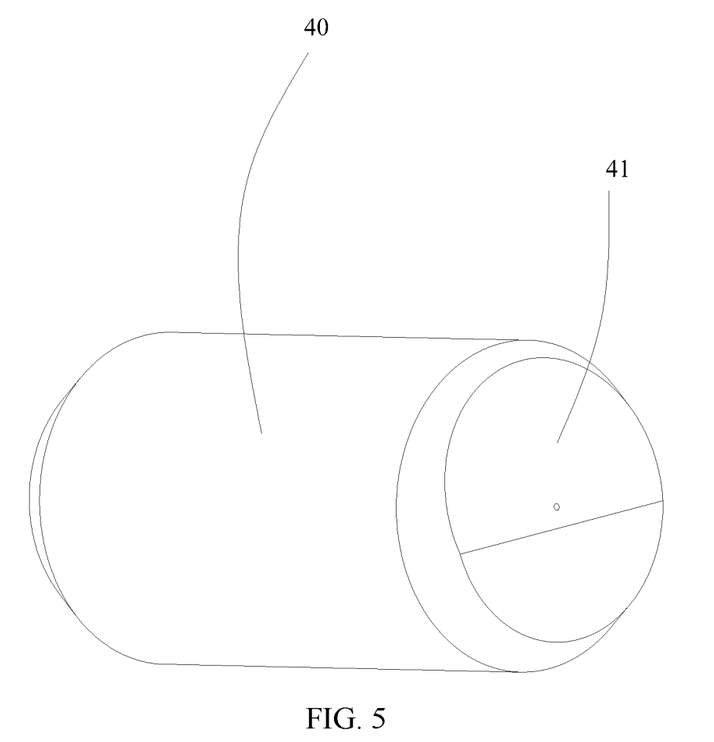
FIG. 5 is a three-dimensional schematic diagram of a ferrule of an optical transceiver according to an implementation manner of the present invention.
Figure 6:
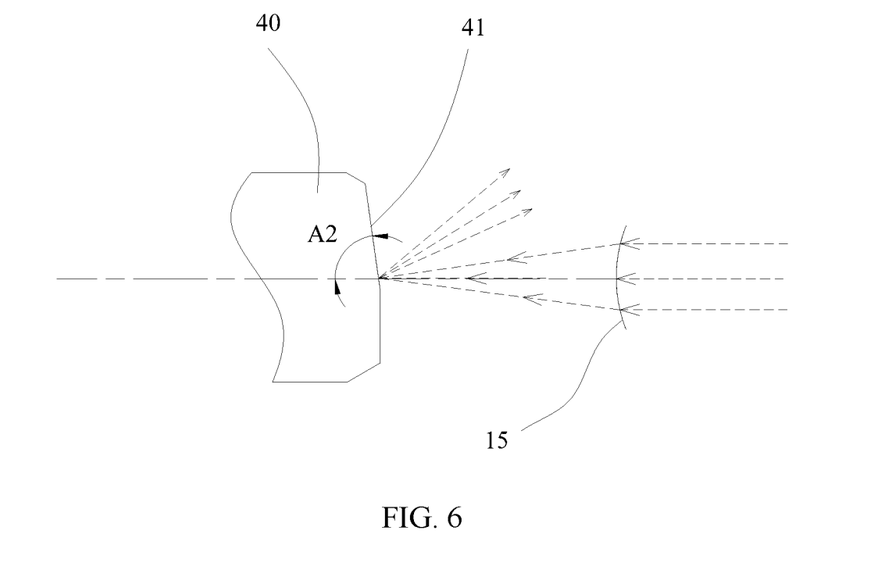
FIG. 6 is a schematic diagram showing that a ferrule of an optical transceiver reflects light coming from a second lens according to an implementation manner of the present invention.

Referring to both FIG. 5 and FIG. 6, the optical transceiver 100 further includes a ferrule 40; the ferrule 40 is located at an end face of the optical fiber and is opposite to the second lens 15; the ferrule 40 includes a bevel 41; the bevel 41 is disposed at a side, opposite to the second lens 15, of the ferrule 40; and the bevel 41 is configured to reflect light passing through the second lens 15 and incident to the ferrule 40 towards a direction deviating from a major axis of the second lens 15, so as to prevent light reflected by the ferrule 40 from returning to the second lens 15 along an original light path. That is, existence of the bevel 41 disables the light reflected by the ferrule 40 to return to the second lens 15 along the original light path, and further to return to the coupling assembly 10, thereby reducing light returning to lasers that are configured to emit light of different wavelengths and are opposite to first lenses 13. Such design may be applied to an optical communications product including a return-loss-sensitive high-speed laser, and improves an optical performance of the optical transceiver 100 of the present invention.

The ferrule 40 is made of a ceramic or metal material. A major axis of the second lens 15 intersects with the bevel, and a range of an angle A2 formed between the bevel and the major axis of the second lens 15 is from 82° to 86°.

In an implementation manner, the coupling assembly 10 is provided with a groove 16 and multiple dispensing grooves 17; the multiple dispensing grooves 17 are distributed at two sides of the groove 16 and are in communication with the groove 16; the multiple filters 22 are accommodated in the groove 16; the second surface 12 is located at a bottom wall of the groove 16; and the dispensing grooves 17 are configured to be filled with glue, so as to connect the multiple filters 22 to the second surface 12 by means of gluing. The size of the groove 16 matches that of the filters 22, that is, the filters 22 are positioned by using the groove 16, and then are fastened by using the glue. The coupling assembly 10 is integrally formed by means of molding. A refractive index of the glue is between a refractive index of a material for the molding and a refractive index of the filters 22, so as to facilitate reduction of reflection and reduction of an insertion loss and a return loss of the optical transceiver 100.

The reflector 23 is a reflective coating coated on the fourth surface 212 of the fastener 21, or the reflector 23 is an element that is independent from the fastener 21 and is fastened to the fourth surface 212 by means of gluing Referring to FIG. 7, the multiple first lenses 13 are distributed in a manner of equally spaced rows; a distance between central axes of two adjacent filters 22 is D; a vertical distance between the third surface 211 and the fourth surface 212 of the fastener 21 is T; an angle of reflection of the light of different wavelengths in the fastener 21 is α; and D=2*Tan(α)*T.

The distance D between the central axes of the two adjacent filters 22 is preferably, but is not limited to being, from 250 micrometers to 1500 micrometers.

In an implementation manner, the present invention provides an optical communications product, including: an optical fiber and multiple lasers, where the multiple lasers are configured to emit light of different wavelengths separately, and the optical communications product further includes: the optical transceiver 100, where the optical transceiver 100 receives the light of different wavelengths emitted by the multiple lasers and transmits the light of different wavelengths to the optical fiber, so as to implement a multiplexing function.

In another implementation manner, the present invention provides an optical communications product, including: an optical fiber and a receiver chip, where the optical fiber is configured to transmit light of different wavelengths to the receiver chip, and the optical communications product further includes: the optical transceiver 100, where the optical transceiver 100 receives the light of different wavelengths transmitted by the optical fiber and transmits the light of different wavelengths to the receiver chip, so as to implement a demultiplexing function.

Figure 8:
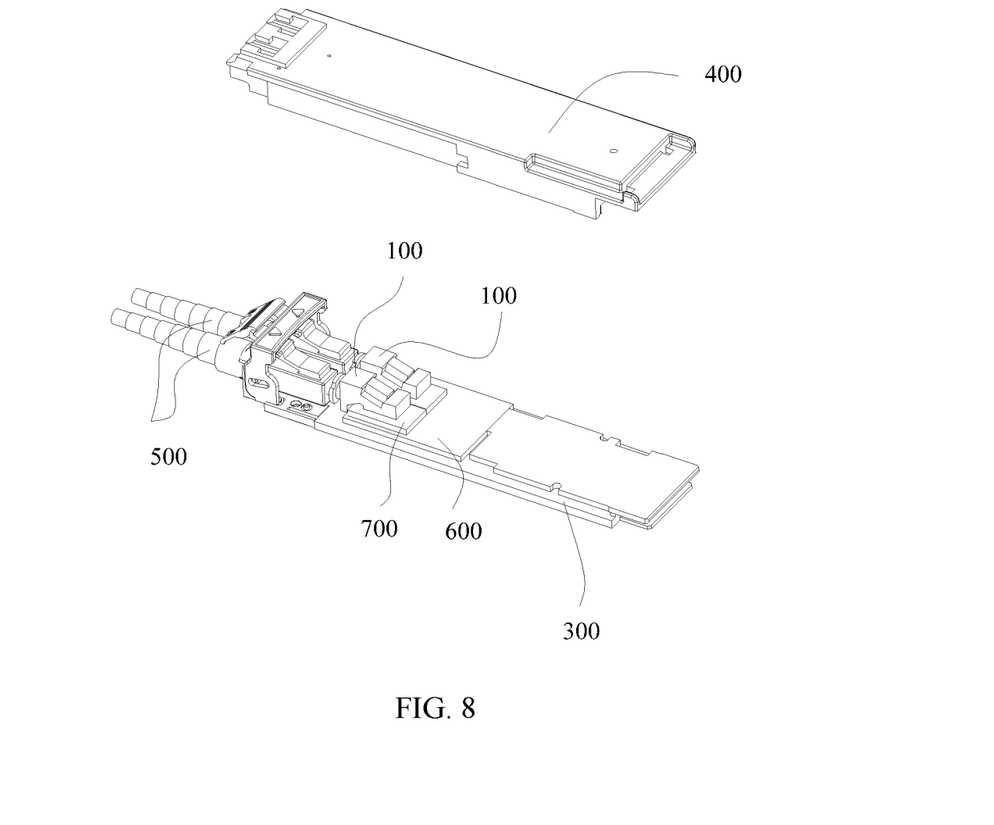
FIG. 8 is a schematic diagram of an optical communications product according to an implementation manner of the present invention.

FIG. 8 shows a schematic diagram of an optical communications product according to an implementation manner of the present invention. The optical communications product may be a QSFP (Quad Small Form-factor Pluggable) module. The optical communications product includes a bottom board 300 and an upper cover 400; the bottom board 300 and the upper cover 300 are engaged with each other to form a housing of the optical communications product; an optical transceiver 100 is accommodated in the housing; an optical fiber 500 is inserted into an optical fiber accommodating member 30 of the optical transceiver 100; a substrate 600 is disposed on the bottom board 300; and the substrate 600 may be a PCB, a flexible PCB, a ceramic substrate, or an organic board. An optical communications module main board 700 is disposed on the substrate 600, and a laser or a receiver chip is disposed on the optical communications module main board 700.

The foregoing descriptions are exemplary implementation manners of the present invention. It should be noted that a person of ordinary skill in the art may make certain improvements and polishing without departing from the principle of the present invention and the improvements and polishing shall fall within the protection scope of the present invention.

What is claimed is:

1. An optical transceiver, comprising:
   a coupling assembly; and
   a condensing assembly;
   wherein the coupling assembly comprises a first surface and a second surface that are oppositely disposed, wherein an angle is formed between the second surface and the first surface, and wherein multiple first lenses are disposed on the first surface;
   wherein the condensing assembly comprises a fastener, multiple filters, a reflector, and a light passing region, wherein the fastener comprises a third surface and a fourth surface that are oppositely disposed, the multiple filters and the light passing region are disposed on the third surface, the light passing region is located on a side of the multiple filters, and the reflector is disposed on the fourth surface;
   wherein the condensing assembly is fastened to the second surface;
   wherein each of the multiple filters is optically aligned with a respective first lens of the multiple first lenses, wherein each of the multiple filters comprises a pair of light outgoing/incoming surfaces and a pair of side surfaces, wherein the pair of side surfaces are connected between the pair of light outgoing/incoming surfaces, the pair of light outgoing/incoming surfaces are attached to the second surface and the third surface, and the side surfaces of each filter are perpendicular to the first surface;
   wherein the coupling assembly is configured to receive light of different wavelengths;
   wherein the condensing assembly and the coupling assembly are configured such that the light of different wavelengths enters the fastener through the multiple filters and is multiplexed or demultiplexed by the reflector and the filters, and multiplexed or demultiplexed light enters the coupling assembly through the light passing region;

wherein a major axis of each first lens is perpendicular to the first surface; and wherein the angle between the first surface and the second surface is within a range from 6° to 13°.

2. The optical transceiver according to claim 1, wherein the pairs of light outgoing/incoming surfaces of the filters are arranged in a parallel manner, and the pairs of side surfaces of the filters are also arranged in a parallel manner.

3. An optical transceiver, comprising:
a coupling assembly; and
a condensing assembly;
wherein the coupling assembly comprises a first surface and a second surface that are oppositely disposed, wherein an angle is formed between the second surface and the first surface, and wherein multiple first lenses are disposed on the first surface;
wherein the condensing assembly comprises a fastener, multiple filters, a reflector, and a light passing region, wherein the fastener comprises a third surface and a fourth surface that are oppositely disposed, the multiple filters and the light passing region are disposed on the third surface, the light passing region is located on a side of the multiple filters, and the reflector is disposed on the fourth surface;
wherein the condensing assembly is fastened to the second surface;
wherein each of the multiple filters is optically aligned with a respective first lens of the multiple first lenses, wherein each of the multiple filters comprises a pair of light outgoing/incoming surfaces and a pair of side surfaces, wherein the pair of side surfaces are connected between the pair of light outgoing/incoming surfaces, the pair of light outgoing/incoming surfaces are attached to the second surface and the third surface, and the side surfaces of each filter are perpendicular to the first surface;
wherein the coupling assembly is configured to receive light of different wavelengths;
wherein the condensing assembly and the coupling assembly are configured such that the light of different wavelengths enters the fastener through the multiple filters and is multiplexed or demultiplexed by the reflector and the filters, and multiplexed or demultiplexed light enters the coupling assembly through the light passing region;
wherein a major axis of each first lens is perpendicular to the first surface;
wherein the optical transceiver further comprises an optical fiber accommodating member;
wherein the coupling assembly further comprises a total reflector and a second lens;
wherein the optical fiber accommodating member is configured to accommodate an optical fiber, wherein the optical fiber is optically aligned with the second lens; and
wherein the total reflector is configured to reflect, between the second lens and the condensing assembly, the light of different wavelengths;
wherein the coupling assembly and the optical fiber accommodating member are integrally formed;

wherein the optical fiber accommodating member is provided with an optical fiber jack, wherein the optical fiber jack is configured to accommodate the optical fiber; and wherein the optical transceiver further comprises a ferrule, wherein the ferrule is located at an end face of the optical fiber and is opposite to the second lens, wherein the ferrule comprises a bevel, the bevel is disposed on a side, opposite to the second lens, of the ferrule, and the bevel is configured to reflect light passing through the second lens and incident on the ferrule towards a direction deviating from a major axis of the second lens, so as to prevent light reflected by the ferrule from returning to the second lens along an original light path.

4. The optical transceiver according to claim 3, wherein the ferrule is made of a ceramic or metal material.

5. The optical transceiver according to claim 3, wherein the major axis of the second lens intersects with the bevel, and an angle formed between the bevel and the major axis of the second lens is within a range from 82° to 86°.

6. An optical transceiver, comprising:
a coupling assembly; and
a condensing assembly;
wherein the coupling assembly comprises a first surface and a second surface that are oppositely disposed, wherein an angle is formed between the second surface and the first surface, and wherein multiple first lenses are disposed on the first surface;
wherein the condensing assembly comprises a fastener, multiple filters, a reflector, and a light passing region, wherein the fastener comprises a third surface and a fourth surface that are oppositely disposed, the multiple filters and the light passing region are disposed on the third surface, the light passing region is located on a side of the multiple filters, and the reflector is disposed on the fourth surface;
wherein the condensing assembly is fastened to the second surface;
wherein each of the multiple filters is optically aligned with a respective first lens of the multiple first lenses, wherein each of the multiple filters comprises a pair of light outgoing/incoming surfaces and a pair of side surfaces, wherein the pair of side surfaces are connected between the pair of light outgoing/incoming surfaces, the pair of light outgoing/incoming surfaces are attached to the second surface and the third surface, and the side surfaces of each filter are perpendicular to the first surface;
wherein the coupling assembly is configured to receive light of different wavelengths;
wherein the condensing assembly and the coupling assembly are configured such that the light of different wavelengths enters the fastener through the multiple filters and is multiplexed or demultiplexed by the reflector and the filters, and multiplexed or demultiplexed light enters the coupling assembly through the light passing region;
wherein a major axis of each first lens is perpendicular to the first surface; and
wherein the coupling assembly is provided with a groove and multiple dispensing grooves, wherein the multiple dispensing grooves are distributed at two sides of the groove and are in communication with the groove, wherein the multiple filters are accommodated in the groove, wherein the second surface is located at a bottom wall of the groove, and wherein the dispensing grooves are configured to be filled with glue, so as to connect the multiple filters to the second surface.

7. The optical transceiver according to claim 6, wherein the coupling assembly is integrally formed via molding; and
wherein a refractive index of the glue is between a refractive index of a material for the molding and a refractive index of the filters.

8. The optical transceiver according to claim 6, wherein the reflector is a reflective coating coated on the fourth surface of the fastener, or the reflector is an element that is independent from the fastener and is fastened to the fourth surface.

9. An optical transceiver, comprising:
a coupling assembly; and
a condensing assembly;
wherein the coupling assembly comprises a first surface and a second surface that are oppositely disposed, wherein an angle is formed between the second surface and the first surface, and wherein multiple first lenses are disposed on the first surface;
wherein the condensing assembly comprises a fastener, multiple filters, a reflector, and a light passing region, wherein the fastener comprises a third surface and a fourth surface that are oppositely disposed, the multiple filters and the light passing region are disposed on the third surface, the light passing region is located on a side of the multiple filters, and the reflector is disposed on the fourth surface;
wherein the condensing assembly is fastened to the second surface;
wherein each of the multiple filters is optically aligned with a respective first lens of the multiple first lenses, wherein each of the multiple filters comprises a pair of light outgoing/incoming surfaces and a pair of side surfaces, wherein the pair of side surfaces are connected between the pair of light outgoing/incoming surfaces, the pair of light outgoing/incoming surfaces are attached to the second surface and the third surface, and the side surfaces of each filter are perpendicular to the first surface;
wherein the coupling assembly is configured to receive light of different wavelengths;
wherein the condensing assembly and the coupling assembly are configured such that the light of different wavelengths enters the fastener through the multiple filters and is multiplexed or demultiplexed by the reflector and the filters, and multiplexed or demultiplexed light enters the coupling assembly through the light passing region;
wherein the multiple first lenses are distributed in a manner of equally spaced rows; and
wherein $D=2*\mathrm{Tan}(\alpha)*T$, where D is a distance between central axes of two adjacent filters, T is a vertical distance between the third surface and the fourth surface of the fastener, and $\alpha$ is an angle of reflection of the light of different wavelengths in the fastener.

10. The optical transceiver according to claim 9, wherein the distance between the central axes of the two adjacent filters is from 250 micrometers to 1500 micrometers.

11. An optical communications product, comprising:
an optical fiber;
multiple lasers, configured to emit light of different wavelengths; and
an optical transceiver, comprising a coupling assembly and a condensing assembly;
wherein the coupling assembly comprises a first surface and a second surface that are oppositely disposed, wherein an angle is formed between the second surface and the first surface and multiple first lenses are disposed on the first surface;
wherein the condensing assembly comprises a fastener, multiple filters, a reflector, and a light passing region, wherein the fastener comprises a third surface and a fourth surface that are oppositely disposed, the multiple filters and the light passing region are disposed on the third surface, the light passing region is located on a side of the multiple filters, and the reflector is disposed on the fourth surface;
wherein the condensing assembly is fastened to the second surface;
wherein each of the multiple filters is optically aligned with a respective first lens of the multiple first lenses, wherein each of the filters comprises a pair of light outgoing/incoming surfaces and a pair of side surfaces, the pair of side surfaces are connected between the pair of light outgoing/incoming surfaces, the pair of light outgoing/incoming surfaces are attached to the second surface and the third surface, and the side surfaces of each filter are perpendicular to the first surface;
wherein the coupling assembly is configured to receive light of different wavelengths;
wherein the optical transceiver is configured such that the light of different wavelengths enters the fastener through the multiple filters and is multiplexed or demultiplexed by the reflector and the filters, and multiplexed or demultiplexed light enters the coupling assembly through the light passing region; and
wherein the optical transceiver is configured to receive the light of different wavelengths emitted by the multiple lasers and to transmit the light of different wavelengths to the optical fiber, so as to implement a multiplexing function;
wherein a major axis of each first lens is perpendicular to the first surface; and
wherein the angle between the first surface and the second surface is within a range from 6° to 13°.

12. An optical communications product, comprising:
an optical fiber;
a receiver chip; and
an optical transceiver, comprising a coupling assembly and a condensing assembly;
wherein the optical fiber is configured to transmit light of different wavelengths to the receiver chip;
wherein the coupling assembly comprises a first surface and a second surface that are oppositely disposed, wherein an angle is formed between the second surface and the first surface and multiple first lenses are disposed on the first surface;
wherein the condensing assembly comprises a fastener, multiple filters, a reflector, and a light passing region, wherein the fastener comprises a third surface and a fourth surface that are oppositely disposed, the multiple filters and the light passing region are disposed on the third surface, the light passing region is located on a side of the multiple filters, and the reflector is disposed on the fourth surface;
wherein the condensing assembly is fastened to the second surface;
wherein each of the multiple filters is optically aligned with a respective first lens of the multiple first lenses, wherein each of the filters comprises a pair of light outgoing/incoming surfaces and a pair of side surfaces, the pair of side surfaces are connected between the pair of light outgoing/incoming surfaces, the pair of light outgoing/incoming surfaces are attached to the second surface and the third surface, and the side surfaces of each filter are perpendicular to the first surface;

wherein the coupling assembly is configured to receive light of different wavelengths;

wherein the optical transceiver is configured such that the light of different wavelengths enters the fastener through the multiple filters and is multiplexed or demultiplexed by the reflector and the filters, and multiplexed or demultiplexed light enters the coupling assembly through the light passing region; and wherein the optical transceiver is configured to receive the light of different wavelengths transmitted by the optical fiber and to transmit the light of different wavelengths to the receiver chip, so as to implement a demultiplexing function, wherein a major axis of each first lens is perpendicular to the first surface; and wherein the angle between the first surface and the second surface is within a range from 6° to 13°.

* * * * *